US011761412B2

(12) United States Patent
Yamakawa et al.

(10) Patent No.: US 11,761,412 B2
(45) Date of Patent: Sep. 19, 2023

(54) START CONTROLLER FOR ENGINE

(71) Applicant: Mazda Motor Corporation, Hiroshima (JP)

(72) Inventors: Hirotaka Yamakawa, Aki-gun (JP); Hiromu Sugano, Aki-gun (JP); Kenji Tanimura, Aki-gun (JP); Toru Kobayashi, Aki-gun (JP); Daisuke Shimo, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/669,610

(22) Filed: Feb. 11, 2022

(65) Prior Publication Data

US 2022/0307456 A1 Sep. 29, 2022

(30) Foreign Application Priority Data

Mar. 25, 2021 (JP) .................................. 2021-051347

(51) Int. Cl.
*F02N 11/08* (2006.01)
*F02D 41/04* (2006.01)
*F02D 41/30* (2006.01)

(52) U.S. Cl.
CPC ............ *F02N 11/08* (2013.01); *F02D 41/042* (2013.01); *F02D 41/30* (2013.01); *F02D 2200/04* (2013.01)

(58) Field of Classification Search
CPC .. F02N 11/08; F02N 11/0825; F02N 11/0844; F02N 19/005; F02N 11/0818;
(Continued)

(56) References Cited

U.S. PATENT DOCUMENTS

2019/0315339 A1 10/2019 Okumura et al.
2020/0031202 A1\* 1/2020 Jung ..................... B60W 10/30

FOREIGN PATENT DOCUMENTS

EP 1065373 A2 \* 1/2001 ............ F02N 11/084
JP 2008274881 A \* 11/2008
(Continued)

OTHER PUBLICATIONS

European Patent Office, Extended European Search Report Issued in Application No. 21216194.7, dated Jun. 14, 2022, Germany, 7 pages.

*Primary Examiner* — Joseph J Dallo
(74) *Attorney, Agent, or Firm* — Alleman Hall Creasman & Tuttle LLP

(57) ABSTRACT

Provided is a start controller for an engine capable of reducing torque of a starter consumed to start the engine. The start controller includes a stop position sensor that detects a position of a piston in each cylinder at an engine stop time, an intake pressure sensor that detects an intake pressure in an intake passage, and a processor that determines whether the position of the piston in each of the cylinders detected by the stop position sensor is within a specified target range after the engine is stopped. In the case where it is determined that the position of the piston in each of the cylinders after the engine stop is out of the target range and the intake pressure detected by the intake pressure sensor is lower than an atmospheric pressure, the engine is started by a motor even when an engine start condition is not satisfied.

5 Claims, 11 Drawing Sheets

(58) Field of Classification Search
CPC .. F02N 2019/008; F02D 41/042; F02D 41/30; F02D 2200/04; Y02T 10/40
See application file for complete search history.

(56) References Cited

FOREIGN PATENT DOCUMENTS

| | | | |
|---|---|---|---|
| JP | 2013060827 A | 4/2013 | |
| WO | WO-2008081281 A1 * | 7/2008 | .............. F01N 11/00 |
| WO | WO-2011013800 A1 * | 2/2011 | ........... F02D 41/042 |
| WO | WO-2013035180 A1 * | 3/2013 | ............... B60K 6/48 |
| WO | WO-2016156699 A1 * | 10/2016 | ......... F02D 41/0002 |

\* cited by examiner

START CONTROLLER FOR ENGINE

TECHNICAL FIELD

The present disclosure relates to a start controller that is provided for an engine including a motor capable of forcibly starting the engine by causing a crankshaft to rotate.

BACKGROUND ART

Conventionally, in a vehicle on which an engine is mounted, in order to improve fuel efficiency, the engine is automatically stopped, and thereafter the engine is started by using a starter.

Here, torque of the starter consumed for an engine start is desirably low. For example, in the case where the torque of the starter is used by a device other than the engine, an increase in the torque of the starter consumed for the engine start possibly affects operation of the other device. Thus, it is desired to reduce the torque consumed.

To handle such a problem, it is examined to set a position of each cylinder (a position of a piston in each of the cylinders) at an engine stop time to a position suited for the start, that is, a position at which the torque of the starter consumed for the engine start can be reduced. For example, in an engine disclosed in JP2013-60827A, the following control is executed immediately before the engine stop. That is, control is executed to increase an opening degree of a throttle valve after completion of air intake of a stop-time expansion stroke cylinder (a final expansion cylinder in JP2013-60827A) as a cylinder that is stopped in an expansion stroke, so as to increase an intake amount of a stop-time compression stroke cylinder (a final compression cylinder in JP2013-60827A) as a cylinder that is stopped in a compression stroke.

SUMMARY OF THE INVENTION

Problem to be Solved by the Invention

In the engine disclosed in JP2013-60827A, a lift of the piston in the cylinder is suppressed by increasing the intake amount of the stop-time compression stroke cylinder. Accordingly, it is considered that such a possibility, that a stop position of the stop-time compression stroke cylinder is shifted to a top dead center side from a desired position, is reduced. However, depending on a response delay of the throttle valve, and the like, the intake amount of the stop-time compression stroke cylinder may not be increased sufficiently, and a possibility that the stop position of the stop-time compression stroke cylinder is shifted from the desired position is not zero. In addition, in the case where the stop position of the stop-time compression stroke cylinder, that is, a stop position of each of the cylinders in the engine is not the desired position, the torque of the starter consumed for the engine start as described above is increased.

The present disclosure has been made in view of circumstances as described above and therefore has a purpose of providing a starter for an engine capable of reducing torque of the starter that is consumed for an engine start at the engine start.

Means for Solving the Problem

In order to solve the above problem, the present disclosure provides a start controller provided for an engine including a plurality of cylinders, a plurality of injectors that supply fuel to a respective one of the cylinders, a respective piston that is provided in each of the cylinders in a reciprocal manner, a crankshaft that rotates in an interlocking manner with reciprocating motion of the piston, a motor capable of forcibly starting an engine by causing the crankshaft to rotate, and an intake passage through which intake air to be introduced into each of the cylinders flows. The start controller includes a stop position sensor that detects a position of the piston in each of the cylinders at an engine stop time, an intake pressure sensor that detects an intake pressure which is a pressure in the intake passage, and a control device that controls the engine including the injectors and the motor. The control device includes a processor configured to execute a stop control module that stops a fuel supply into the cylinders by the injectors to stop the engine when a specified engine stop condition is satisfied, a start control module that starts the engine by the motor when a specified engine start condition is satisfied after a stop of the engine, and a determination module that determines whether the position of the piston in each of the cylinders detected by the stop position sensor is within a specified target range after the stop of the engine. In a case where the determination module determines that the position of the piston in each of the cylinders is out of the target range and the intake pressure detected by the intake pressure sensor is lower than an atmospheric pressure, the start control module starts the engine by the motor even when the engine start condition is not satisfied.

When the engine is stopped, a pressure in the cylinder in which an intake valve is opened is substantially equal to the intake pressure. Accordingly, when the intake pressure is low, an in-cylinder pressure and an intake amount of the cylinder that is stopped during transition from an intake stroke to a compression stroke and in which the intake valve remains to be opened become low. Accordingly, when the intake pressure is low, torque consumed by a starter to lift the piston in the cylinder and start the engine is suppressed to be relatively low. However, even in the case where the intake pressure immediately after the engine stop is low, air and the like leak into the intake passage, and the intake pressure is increased when a stopped period of the engine extends. As a result, the torque consumed by the starter to start the engine is increased.

To handle such a problem, in the present disclosure, in the case where the position of the piston in each of the cylinders is out of the target range at the engine stop time, the motor starts the engine while the intake pressure is lower than the atmospheric pressure and thus is relatively low without waiting for the engine start condition to be satisfied. That is, in the present disclosure, in the case where the torque of the motor consumed for the engine start tends to be increased due to a fact that the position of the piston in each of the cylinders is out of the target range at the engine stop time, the engine is started before this torque is further increased in association with the increase in the intake pressure. Therefore, according to the present disclosure, it is possible to suppress the torque of the motor consumed for the engine start to be low.

In this configuration, preferably, in a case where the determination module determines that the position of the piston in each of the cylinders is out of the target range and the intake pressure detected by the intake pressure sensor is lower than a specified determination pressure that is lower than the atmospheric pressure, the start control module starts the engine by the motor when the engine start condition is satisfied or when the intake pressure is increased to the determination pressure.

With this configuration, while the intake pressure is lower than the determination pressure and thus is sufficiently low and the torque of the motor consumed for the engine start is thereby sufficiently low, the engine is started upon satisfaction of the engine start condition. Thus, it is possible to secure the stopped period of the engine and suppress degradation of fuel efficiency thereof while suppressing the torque of the motor consumed for the engine start to be low.

In the configuration, preferably, in a case where the determination module determines that the position of the piston in each of the cylinders is out of the target range, the start control module sets the determination pressure to a lower value as a shifting amount of the position of the piston from the target range is increased.

With this configuration, as the torque of the motor for the engine start is increased due to the large shifting amount of the position of the piston in each of the cylinders from the target range at the engine stop time, the determination pressure is reduced, and the engine is started in a state where the intake pressure is further reduced. Therefore, it is possible to further reliably suppress the torque of the motor consumed for the engine start to be low.

Advantage of the Invention

As it has been described so far, according to the start controller for an engine in the present disclosure, it is possible to reduce the torque of the motor consumed for the engine start.

MODES FOR CARRYING OUT THE INVENTION (1) Overall Configuration

Figure 1:
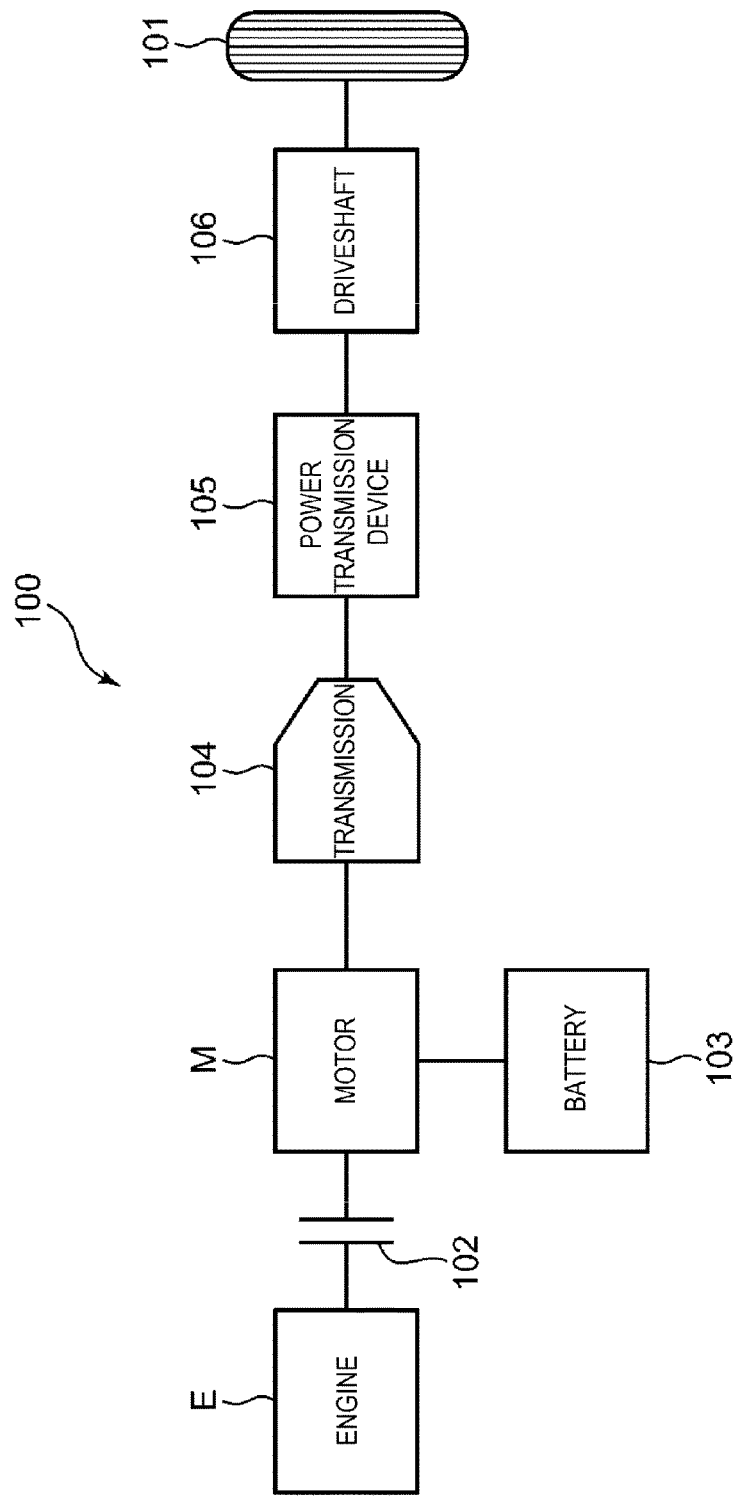
FIG. 1 is a schematic configuration diagram of a vehicle on which an engine, to which a start controller according to an embodiment of the present disclosure is applied, is mounted.

FIG. 1 is a schematic configuration diagram of a vehicle 100 on which an engine E, to which a start controller for an engine according to an embodiment of the present disclosure is applied, is mounted. In this embodiment, the vehicle 100 is a hybrid vehicle that includes the engine E and a motor M as drive sources of the vehicle 100 (a wheel 101).

As illustrated in FIG. 1, the vehicle 100 includes, in addition to the wheel 101, the engine E, and the motor M, a clutch 102 that couples an output shaft of the engine E and a rotary shaft of the motor M in an engageable and disengageable manner, a battery 103 that exchanges electric power with the motor M, a transmission 104 that is coupled to the motor M, a driveshaft 106 that is coupled to the wheel 101, and a power transmission device 105 that includes a differential gear and the like and couples the transmission 104 and the driveshaft 106.

(Engine Configuration)

Figure 2:
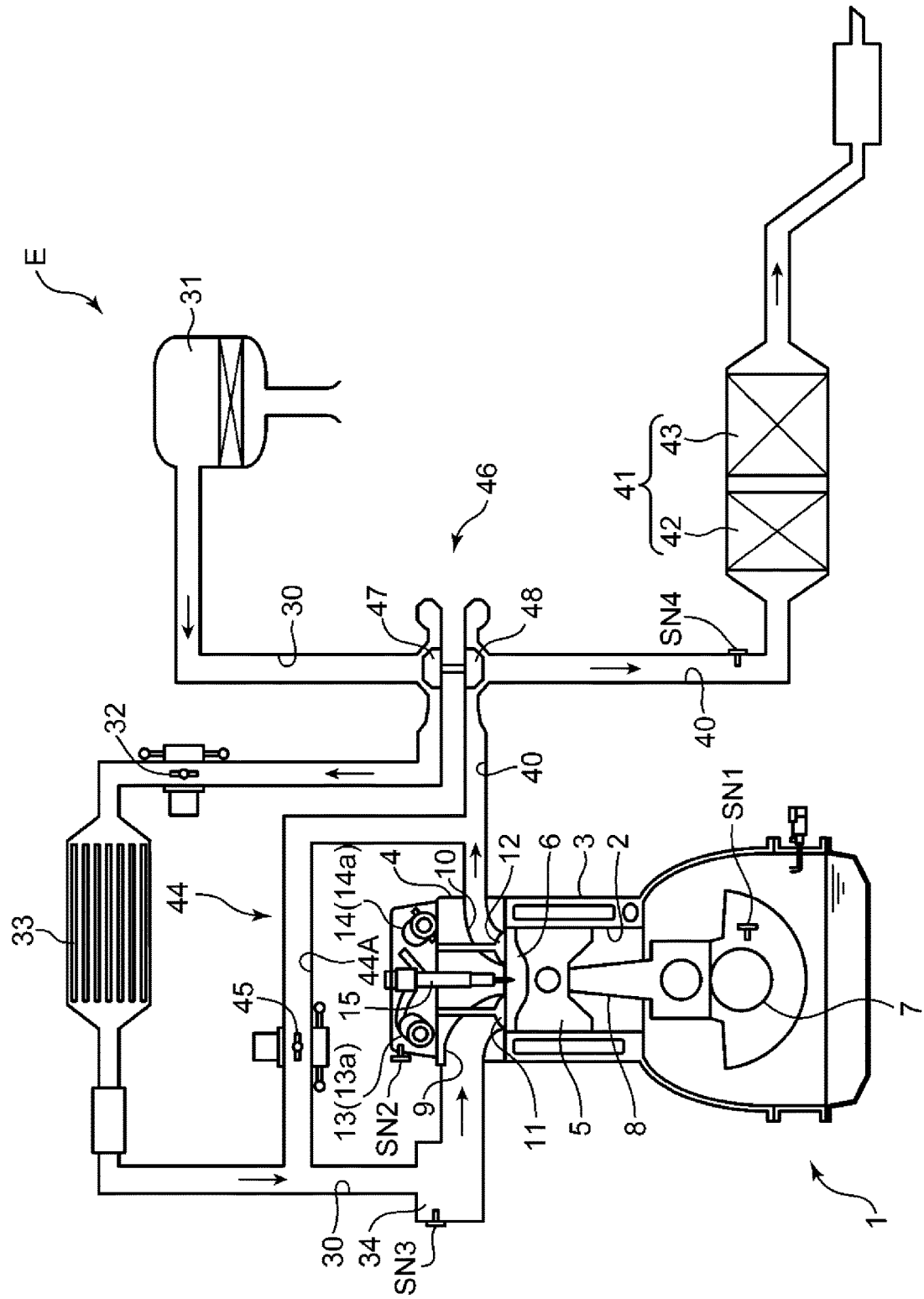
FIG. 2 is a schematic configuration view of the engine.

FIG. 2 is a schematic configuration view of the engine E. The engine E includes an engine body 1, an intake passage 30 through which intake air to be introduced into the engine body 1 flows, an exhaust passage 40 through which exhaust gas discharged from the engine body 1 flows, and an exhaust gas recirculation (EGR) device 44 that circulates EGR gas as some of the exhaust gas flowing through the exhaust passage 40 into the intake passage 30. The engine E also includes a turbocharger 46 having a turbine 48 that is provided in the exhaust passage 40 and a compressor 47 that is provided in the intake passage 30 and is rotationally driven by the turbine 48. The engine E in this embodiment is a four-stroke diesel engine and is driven when being supplied with fuel that has diesel fuel as a main component.

The engine body 1 has a cylinder block 3 that is formed with a cylinder 2 and a cylinder head 4 that covers the cylinder block 3.

Figure 3:
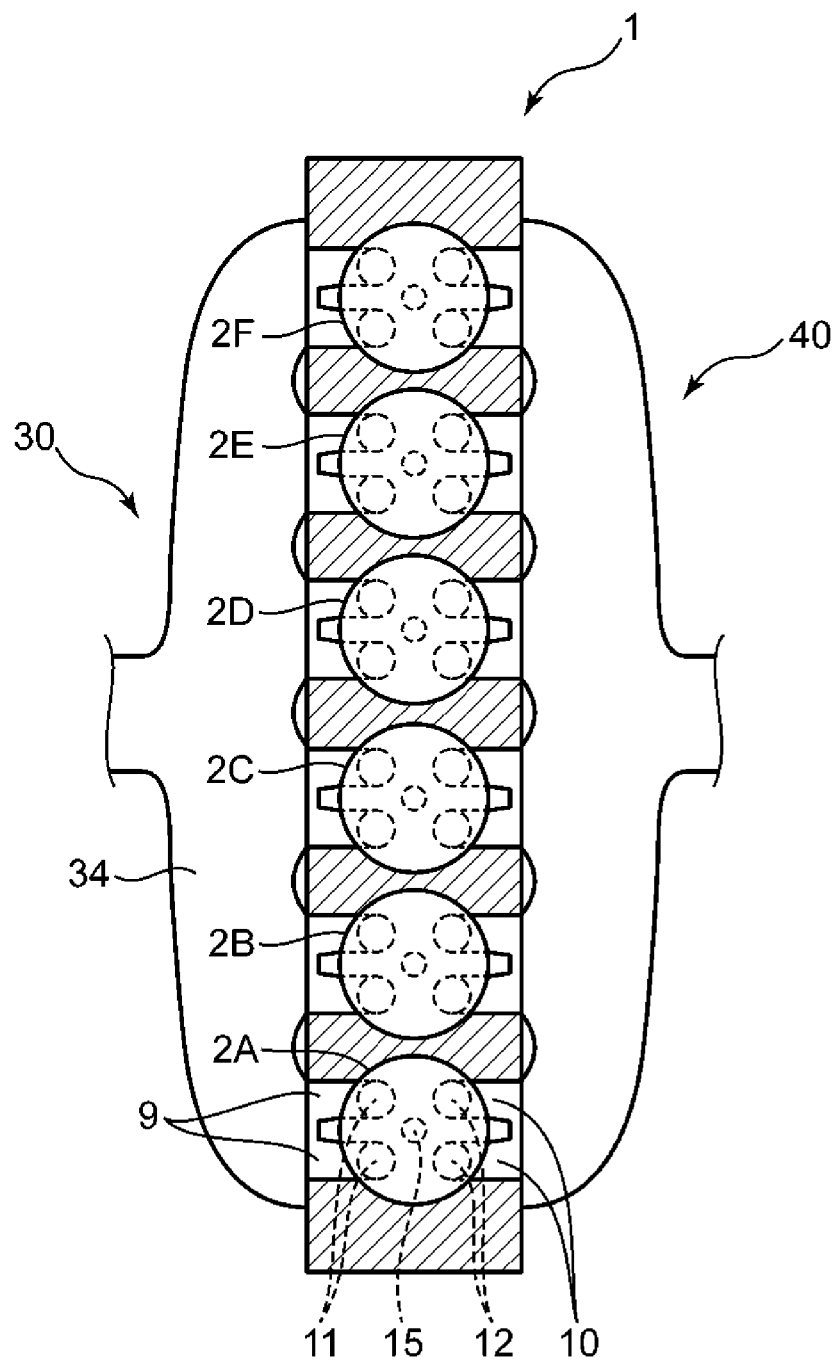
FIG. 3 is a schematic cross-sectional view of an engine body.

FIG. 3 is a schematic cross-sectional view of the engine body 1. As illustrated in FIG. 3, the engine E in this embodiment is an in-line six-cylinder engine. The engine body 1 (in detail, the cylinder block 3) is formed with six cylinders 2 (a first cylinder 2A, a second cylinder 2B, a third cylinder 2C, a fourth cylinder 2D, a fifth cylinder 2E, and a sixth cylinder 2F in an order from one side along an arrangement direction of the cylinders 2) that are aligned in a line.

A piston 5 is accommodated in each of the cylinders 2 in a reciprocal manner. A combustion chamber 6 is defined above the piston 5 in each of the cylinders 2. Each of the pistons 5 is coupled to a crankshaft 7 via a connecting rod 8. The crankshaft 7 rotates about a center axis thereof according to reciprocating motion of each of the pistons 5.

An injector 15 that injects fuel into the cylinder 2 (the combustion chamber 6) is attached to the cylinder head 4, and one injector 15 is provided per cylinder 2. The piston 5 reciprocates when an air-fuel mixture of the supplied fuel and supplied air is burned in the combustion chamber 6 and the piston 5 is pushed down by an expansion force generated by the combustion.

The cylinder head 4 is provided with, for each of the cylinders 2 an intake port 9 used to introduce the intake air to each of the cylinders 2 (the combustion chamber 6), an intake valve 11 that opens and closes the intake port 9, an exhaust port 10 used to discharge the exhaust gas, which is generated in each of the cylinders 2 (the combustion chamber 6), and an exhaust valve 12 that opens and closes the exhaust port 10. A valve type of the engine body 1 is a four-valve type having two intake valves and two exhaust valves. For each of the cylinders 2, two each of the intake ports 9 and the exhaust ports 10 are provided. For each of the cylinders 2, two each of the intake valves 11 and the exhaust valves 12 are provided.

Figure 4:
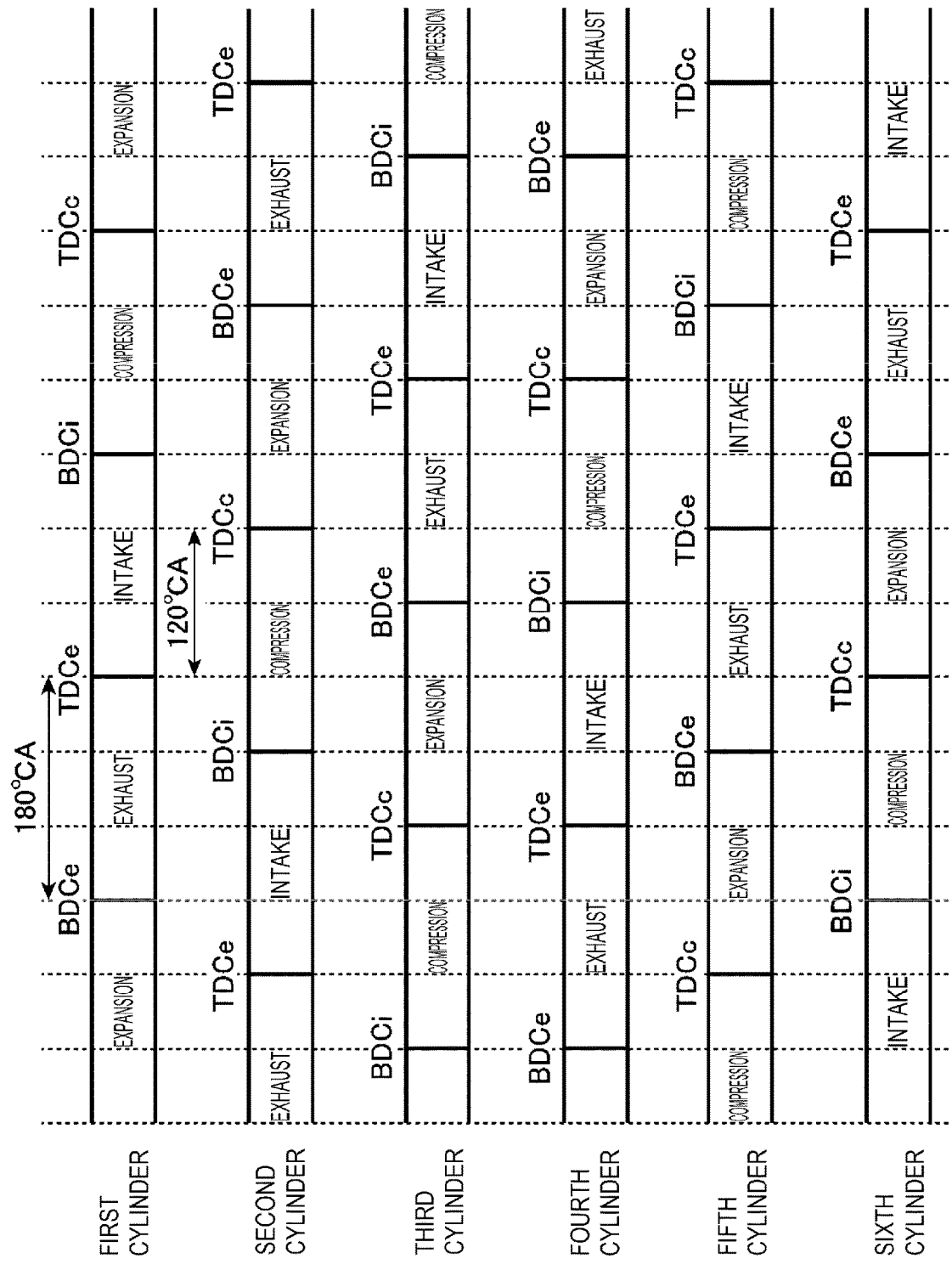
FIG. 4 is a chart illustrating strokes that are performed in each cylinder of the engine.

FIG. 4 is a chart illustrating strokes that are performed in each of the cylinders 2. As described above, the engine E is the four-stroke engine. Thus, in each of the cylinders 2, an intake stroke, a compression stroke, an expansion stroke, and an exhaust stroke are sequentially performed in this order. The engine E is the in-line six-cylinder engine. Accordingly, the piston 5, which is provided in each of the cylinders 2A to 2F, reciprocates with a phase difference of 120° CA (120° in a crank angle), and the combustion occurs in an order of the first cylinder 2A, the fifth cylinder 2E, the third cylinder 2C, the sixth cylinder 2F, the second cylinder 2B, and the fourth cylinder 2D at every 120° CA.

Here, the intake, compression, expansion, and exhaust strokes described in the present disclosure refer to periods that are acquired by dividing one combustion cycle, that is, a period in which the crankshaft 7 rotates twice (360° CA) into four equal periods by the crank angle, and respectively refer to periods in which air intake, compression, expansion, and exhaust are primarily performed.

More specifically, the intake stroke described in the present disclosure does not refer to a period from time at which the intake valve 11 actually starts being opened to time at which the intake valve 11 is closed, but refers to a period in which the piston 5 is located between exhaust top dead center TDCe and intake bottom dead center BDCi. The compression stroke refers to a period in which the piston 5 is located between the intake bottom dead center BDCi and compression top dead center TDCc. The expansion stroke refers to a period in which the piston 5 is located between the compression top dead center TDCc and expansion bottom dead center BDCe. The exhaust stroke refers to a period in which the piston 5 is located between the expansion bottom dead center BDCe and the exhaust top dead center TDCe.

Here, the compression top dead center TDCc is a position on the uppermost side (a near side of the cylinder head 4) in a reciprocation range of the piston 5 and is a position that the piston 5 reaches after the intake valve 11 is closed and before the exhaust valve 12 is opened. Each of the expansion bottom dead center BDCe, the exhaust top dead center TDCe, and the intake bottom dead center BDCi is a position of the piston 5 at the time when the crankshaft 7 rotates positively for 180° CA, 360° CA, and 540° CA from a state where the piston 5 is located at the compression top dead center TDCc. Hereinafter, the position of the piston 5 will appropriately be described as a position of the cylinder 2.

The intake valve 11 in each of the cylinders 2 is driven by a valve mechanism 13 that includes an intake camshaft disposed in the cylinder head 4. The valve mechanism 13 for the intake valves 11 includes an intake S-VT 13a capable of changing open and close timings of the intake valves 11 collectively. Similarly, the exhaust valve 12 in each of the cylinders 2 is driven by a valve mechanism 14 that includes an exhaust camshaft disposed in the cylinder head 4. The valve mechanism 14 for the exhaust valves 12 includes an exhaust S-VT 14a capable of changing open and close timings of the exhaust valves 12 collectively. The intake S-VT 13a (the exhaust S-VT 14a) is a so-called phase-type variable mechanism, and simultaneously changes open initiation timing IVO (EVO) and close timing IVC (EVC) of each of the intake valves 11 (each of the exhaust valves 12) by the same amount.

The intake passage 30 is connected to one side surface of the cylinder head 4 in a manner to communicate with the intake port 9. In the intake passage 30, an air cleaner 31, the compressor 47, the throttle valve 32, an intercooler 33, and a surge tank 34 are provided in this order from an upstream side. The compressor 47 is rotationally driven by the turbine 48 as described above and compresses (supercharges) the air that flows through the compressor 47. The air that has been compressed by the compressor 47 and then cooled by the intercooler 33 is introduced into the cylinder 2 (the combustion chamber 6). The throttle valve 32 is a valve capable of opening and closing the intake passage 30. An amount of air that flows through the intake passage 30, and hence, an amount of the intake air that is introduced into the cylinder 2 (the combustion chamber 6) varies according to an opening degree of the throttle valve 32.

The exhaust passage 40 is connected to another side surface of the cylinder head 4 in a manner to communicate with the exhaust port 10. The exhaust passage 40 is provided with the turbine 48 and an exhaust purifier 41 for purifying the exhaust gas in this order from an upstream side. The exhaust purifier 41 includes a three-way catalyst 42 and a diesel particulate filter (DPF) 43. The turbine 48 rotates by receiving energy of the exhaust gas flowing through the exhaust passage 40, and the compressor 47 rotates in an interlocking manner therewith.

The EGR device 44 includes an EGR passage 44A that connects the exhaust passage 40 and the intake passage 30 and an EGR valve 45 that is provided in the EGR passage 44A. The EGR passage 44A connects a portion of the exhaust passage 40 on an upstream side of the turbine 48 and a portion of the intake passage 30 between the intercooler 33 and the surge tank 34. The EGR valve 45 is a valve capable of opening and closing the EGR passage 44A. An amount of EGR gas that is circulated into the intake passage 30, and hence, an amount of the EGR gas that is introduced into the cylinder 2 (the combustion chamber 6) varies according to an opening degree of the EGR valve 45. In the EGR passage 44A, an EGR cooler (not illustrated) is arranged to cool the exhaust gas (the EGR gas) that is circulated from the exhaust passage 40 into the intake passage 30 by heat exchange.

(2) Control System

Figure 5:
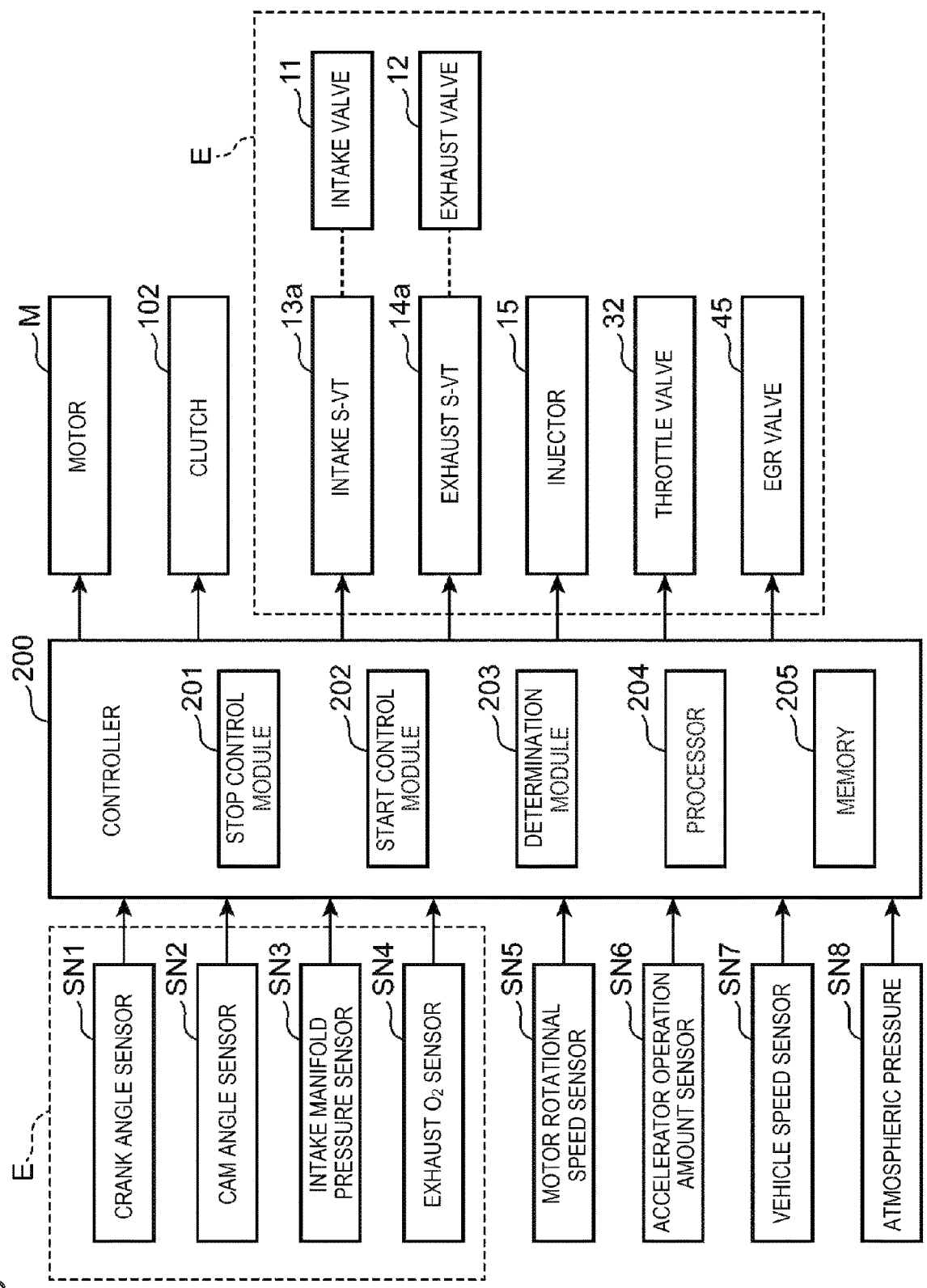
FIG. 5 is a block diagram illustrating a control system for the engine.

FIG. 5 is a block diagram illustrating a control system of the vehicle 100. A controller 200 illustrated in FIG. 5 is a microcomputer that integrally controls the motor M, the engine E, and the like, and is constructed of a processor 204 (e.g., a central processing unit (CPU), memory 205 (e.g., ROM and/or RAM), which are well-known, and the like. The controller 200 is an example of a "control device" in the claims.

The controller 200 receives detection signals from various sensors that are provided in the vehicle 100.

More specifically, in the cylinder block 3 of the engine E, a crank angle sensor SN1 is provided to detect a rotation angle of the crankshaft 7, that is, an engine speed. In the cylinder head 4 of the engine E, a cam angle sensor SN2 is provided to detect an angle of an intake cam that is provided in the intake valve mechanism 13. The controller 200 determines which cylinder is in what stroke on the basis of the detection signal of the cam angle sensor SN2 and the detection signal of the crank angle sensor SN1. In a portion of the intake passage 30 of the engine E on a downstream side of the throttle valve 32, an intake manifold pressure sensor SN3 is provided to detect a pressure of the intake air flowing through this portion. Hereinafter, the pressure of the intake air that flows through the portion of the intake passage 30 on the downstream side of the throttle valve 32 will be referred to as an intake manifold pressure. The intake air described in the present specification refers to the gas that is introduced into the cylinder 2 (the combustion chamber 6) and, when the EGR gas is introduced in addition to the air into the cylinder 2, refers to gas containing the EGR gas and the air. In the exhaust passage 40 of the engine E, an exhaust $O_2$ sensor SN4 is provided to detect exhaust $O_2$ concentration that is concentration of oxygen contained in the exhaust gas flowing through the exhaust passage 40. The exhaust $O_2$ sensor SN4 is arranged between the turbine 48 and the exhaust purifier 41. The vehicle 100 is also provided with: a motor rotational speed sensor SN5 that detects a rotational speed of the motor M, an accelerator operation amount sensor SN6 that detects an accelerator operation amount as an operation amount of an accelerator pedal operated by a driver who drives the vehicle 100, a vehicle speed sensor SN7 that detects a vehicle speed, an atmospheric pressure sensor SN8 that detects an atmospheric pressure; and the like. The controller 200 sequentially receives the information detected by these sensors SN1 to SN7. Here, the intake manifold pressure sensor SN3 is an example of an "intake pressure sensor" in the present disclosure, and the intake manifold pressure, that is, the pressure of the intake air that flows through the portion of the intake passage 30 in the engine E on the downstream side of the throttle valve 32 is an example of an "intake pressure" in the present disclosure.

The controller 200 makes various determinations, calculations, and the like on the basis of the input information from each of the sensors to control sections of the engine E such as the intake S-VT 13a, the exhaust S-VT 14a, the injector 15, the throttle valve 32, and the EGR valve 45, the motor M, the clutch 102, and the like. The controller 200 includes a stop control module 201 that performs an engine stop control, which will be described below, to automatically stop the engine E, a start control module 202 that performs an engine start control and start timing adjustment control, which will be described below, to start the engine E, and a determination module 203 that determines whether a cylinder stop position, which will be described below, is within a target range X0, which will be described below. These modules are executed by the processor 204 to perform their respective functions and are stored in the memory 205 as software modules.

In this embodiment, the intake valve 11 is configured to be always closed on a retarded side from the intake bottom dead center BDCi during operation of the engine E, and the controller 200 controls the intake S-VT 13a to achieve this.

In addition, in this embodiment, a basic travel mode of the vehicle 100 is set to an EV mode in which the wheel 101 is driven only by the motor M, and the mode is switched to an engine drive mode in which the engine E is driven only when the output of the motor M alone is insufficient, or the like. The controller 200 switches the travel mode on the basis of the vehicle speed and the like.

More specifically, the controller 200 determines, from a travel state of the vehicle 100 and an operation state of the accelerator pedal, whether an engine start condition as a condition to start the engine E is satisfied and whether an engine stop condition as a condition to stop the engine E is satisfied. For example, the controller 200 determines that the engine start condition is satisfied when, during a stop of the engine E, the vehicle speed becomes equal to or higher than a specified engine start speed and the operation amount of the accelerator pedal becomes equal to or larger than a specified engine start operation amount. Meanwhile, the controller 200 determines that the engine stop condition is satisfied when, during driving of the engine E, the vehicle speed becomes lower than a specified engine stop speed or the operation amount of the accelerator pedal becomes smaller than a specified engine stop operation amount. The controller 200 sequentially determines whether each of the above conditions is satisfied on the basis of detection results of the vehicle speed sensor SN7 and the accelerator operation amount sensor SN6, and the like.

When the engine start condition is satisfied, and the like, the controller 200 (the start control module 202) executes the engine start control to start the engine E. In the engine start control, the controller 200 first shifts the clutch 102 from a disengaged state to an engaged state. When the clutch 102 is brought into the engaged state, the output of the motor M is transmitted to the engine E. In this way, the engine E is forcibly and rotationally driven by the motor M. That is, the engine E starts cranking. When cranking starts, next, the controller 200 injects an initial fuel amount from the injector 15 during the compression stroke of the cylinder 2, which has been stopped near the intake bottom dead center BDCi, to cause self-ignited combustion thereof. Thereafter, the engine start control is shifted to normal engine control, and the controller 200 sequentially injects the fuel from the injector 15 into each of the cylinders 2. Here, as described above, the clutch 102 is brought into the engaged state. In this way, drive power of the engine E is transmitted to the wheel 101 via the motor M, the transmission 104, and the like.

Meanwhile, when determining that the engine stop condition is satisfied, the controller 200 (the stop control module 201) executes the engine stop control to stop the engine E. In the engine stop control, the controller 200 first performs a fuel cut to stop the fuel supply from the injector 15 to each of the cylinders 2. By stopping the fuel supply, the engine speed is reduced, and the engine is eventually stopped. Here, when the engine speed becomes low, the engine body 1 and an engine mount that supports the engine body 1 can possibly resonate and increase vibration of the engine body 1. Thus, as the engine stop control, the controller 200 executes control for fully closing the throttle valve 32. In other words, the engine speed is promptly reduced by fully closing the throttle valve 32, so as to shorten a period in which the engine speed becomes a resonance speed. More specifically, in the case where the engine speed becomes equal to or lower than a specified throttle valve closing speed N1 after the fuel cut, the controller 200 closes the throttle valve 32 until the throttle valve 32 is fully closed. In addition, in the case where the engine E is stopped (the speed of the engine E becomes 0) at the time when the engine stop condition is satisfied, the controller 200 switches the clutch 102 from the engaged state to the disengaged state.

(Engine Stop Position Control)

Next, a description will be made on stop position control that is executed by the controller 200 after the execution of the engine stop control. The stop position control is control for setting the position of each of the cylinders 2 (the piston 5 in each of the cylinders 2) during the stop of the engine E within a specified target range.

Hereinafter, a time in which the engine E is stopped, in detail, a time in which the engine speed is 0 and the engine E is completely stopped will simply be referred to as an engine stop time. In addition, the position of each of the cylinders 2 (the piston 5 in each of the cylinders 2) at the engine stop time will be referred to as the cylinder stop position.

In the present disclosure, the cylinder whose stroke at the engine stop time (when the engine E is completely stopped) is the compression stroke and in which the position of the piston 5 is located within a range from the compression top dead center (TDCc) to 120° CA before the compression top dead center (BTDCc) will be referred to as a stop-time compression stroke cylinder. In addition, the cylinder whose combustion order is one stroke before that of the stop-time compression stroke cylinder, whose stroke at the engine stop time (when the engine E is completely stopped) is the expansion stroke, and in which the position of the piston 5 is within a range from the compression top dead center (TDCc) to 120° CA after the compression top dead center (ATDCc) will be referred to as a stop-time expansion stroke cylinder. Furthermore, the cylinder whose combustion order is one stroke after that of the stop-time compression stroke cylinder, whose stroke at the engine stop time (when the engine E is completely stopped) is the intake stroke or the compression stroke, and in which the position of the piston 5 is within a range from 60° CA before intake bottom dead center (BBDCi) to 60° CA after the intake bottom dead center (ABDCi) will be referred to as a stop-time compression transition cylinder.

Figure 6:
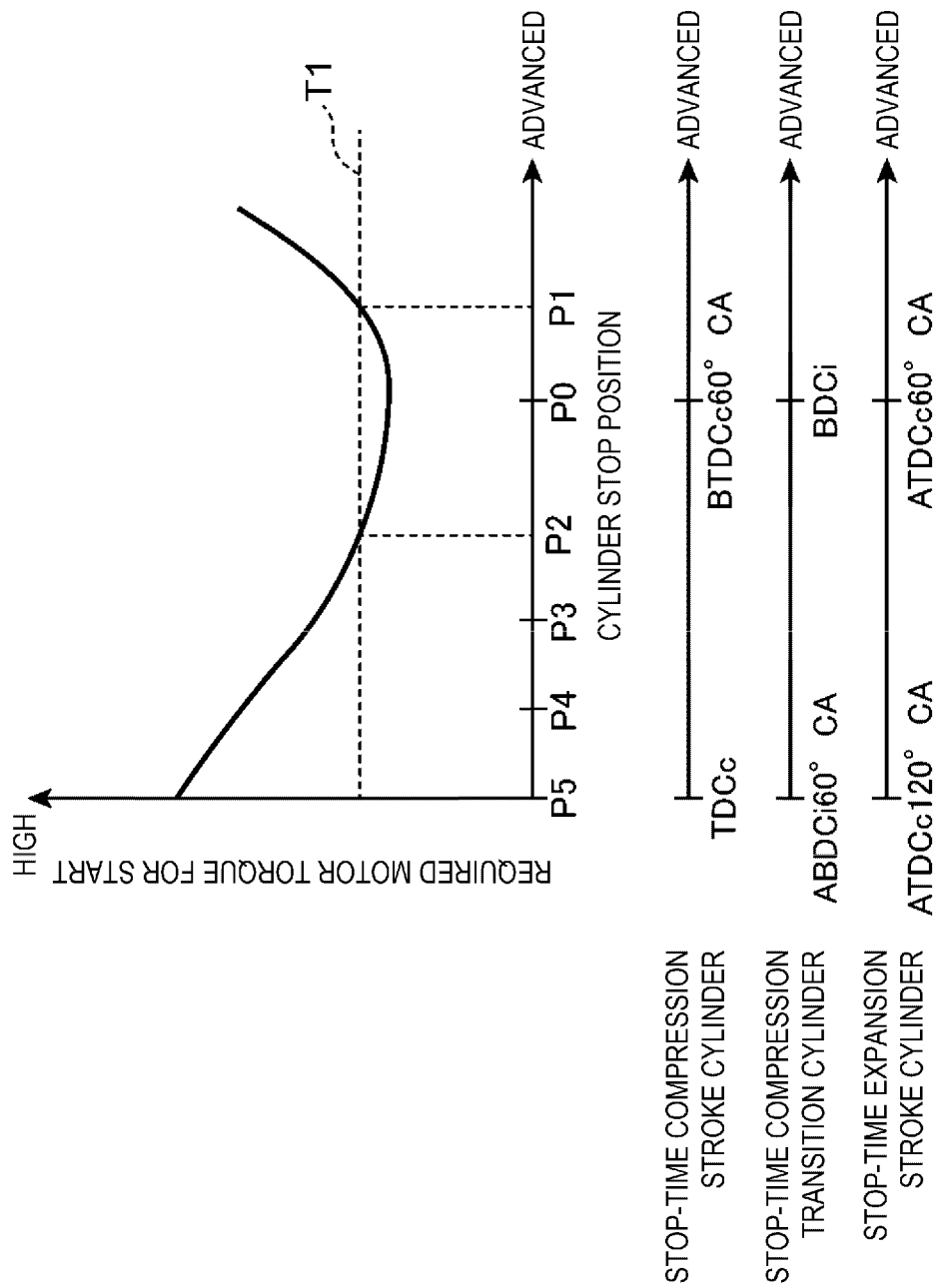
FIG. 6 is a graph illustrating a relationship between a cylinder stop position and motor torque required for an engine start.
Figure 7:
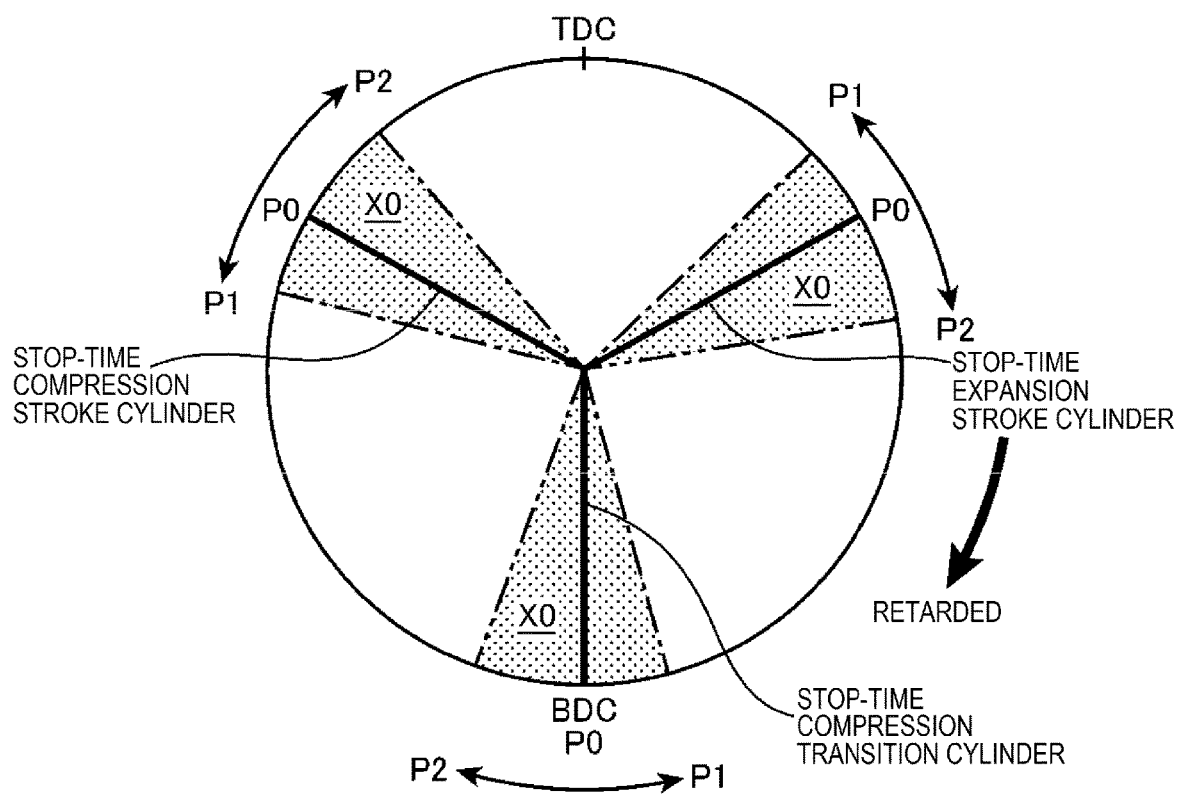
FIG. 7 is a graph illustrating a target range of the cylinder stop position.

FIG. 6 is a graph illustrating a relationship between the cylinder stop position and a minimum value of torque of the motor M required to start the engine E, which has been stopped at this cylinder stop position (hereinafter appropriately referred to as starting torque). A horizontal axis of FIG. 6 also indicates positions of the stop-time compression stroke cylinder, the stop-time compression transition cylinder, and the stop-time expansion stroke cylinder. FIG. 7 is a graph illustrating the target range of the cylinder stop position and a stop position of each of the stop-time compression stroke cylinder, the stop-time compression transition cylinder, and the stop-time expansion stroke cylinder corresponding thereto. FIG. 7 illustrates the position of each of the cylinders 2 (the position of the piston 5 in each of the cylinders 2) such that the highest point of a circle is set as top dead center (TDC), the lowest point thereof is set as bottom dead center (BDC), and the position of the piston 5 moves to the retarded side as the target range moves clockwise.

As illustrated in FIG. 6, the starting torque varies by the cylinder stop position. The cylinder stop position where the starting torque becomes a minimum amount is a position indicated by a solid line in FIG. 6, is a position at which the stop-time compression stroke cylinder is located at 60° CA before the compression top dead center (BTDCc), at which the stop-time expansion stroke cylinder is located at 60° CA after the compression top dead center (ATDCc), and at which the stop-time compression transition cylinder is located at the intake bottom dead center (BDCi). In other words, the starting torque becomes the minimum amount when the pistons 5 in the stop-time compression stroke cylinder and the stop-time expansion stroke cylinder are located at the same position with respect to the top dead center. Hereinafter, the cylinder stop position at the time when this starting torque becomes the minimum amount will be referred to as an optimum position P0.

The target range of the cylinder stop position is a position at which the starting torque is equal to or lower than a specified reference torque T1 at the time when the intake manifold pressure is the atmospheric pressure, and is set as a range from a first position P1 on an advanced side from the optimum position P0 to a second position P2 on the retarded side from the optimum position P0. The reference torque T1 is set to a value between a maximum value and a minimum value of the starting torque. Corresponding to the above, the first position P1 is set at a position at which the position of the stop-time compression stroke cylinder is at 75° CA before the compression top dead center (BTDCc), at which the position of the stop-time compression transition cylinder is at 15° CA before the intake bottom dead center (BBDCi), and at which the position of the stop-time expansion stroke cylinder is at 45° CA after the compression top dead center (ATDCc). Meanwhile, the second position P2 is set at a position at which the position of the stop-time compression stroke cylinder is at 40° CA before the compression top dead center (BTDCc), at which the position of the stop-time compression transition cylinder is at 20° CA after the intake bottom dead center (ABDCi), and at which the position of the stop-time expansion stroke cylinder is at 80° CA after the compression top dead center (ATDCc).

As the stop position control, the controller 200 executes an intake retardation control to prevent the cylinder stop position from being located on the retarded side of the target range X0 and throttle opening degree increase control to prevent the cylinder stop position from being located on the advanced side of the target range X0.

Figure 8:
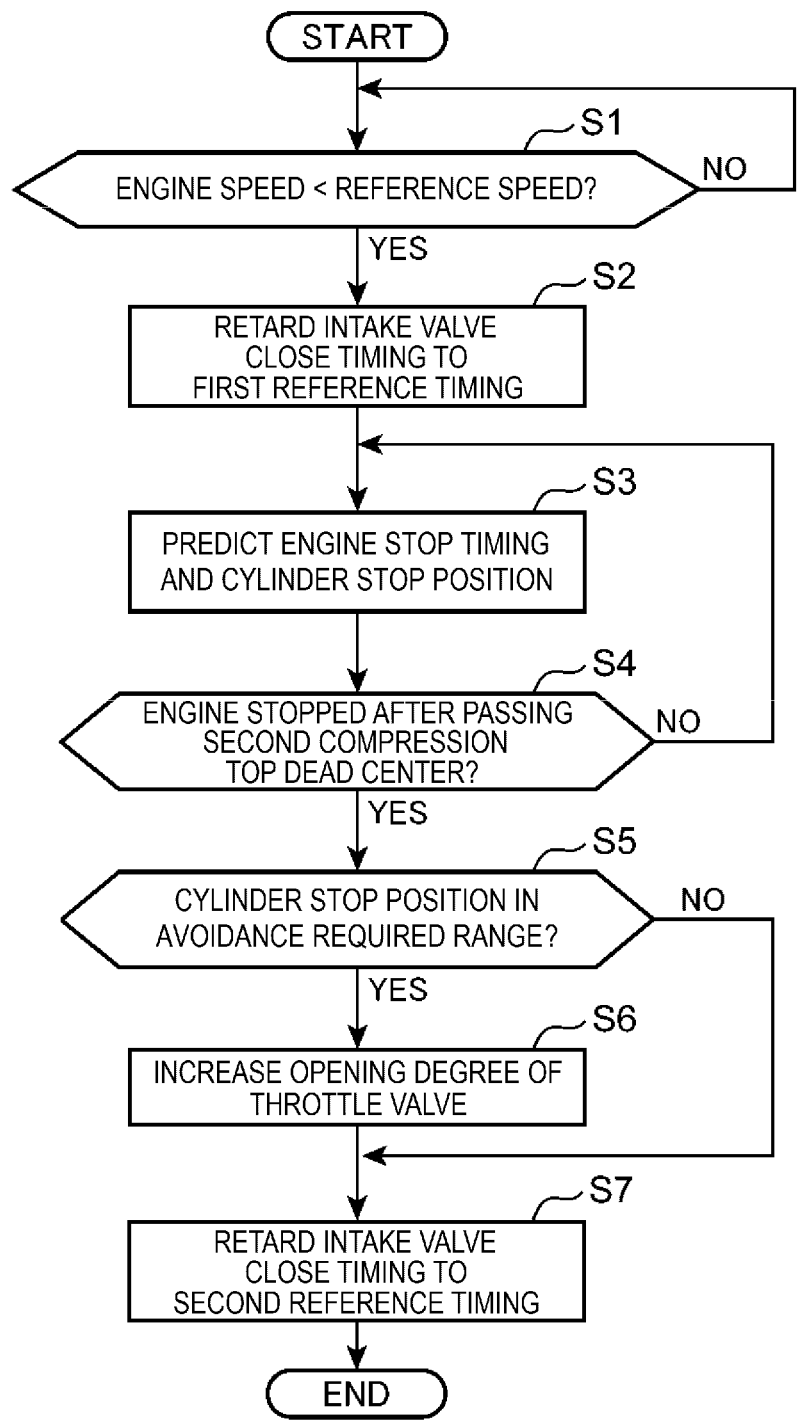
FIG. 8 is a flowchart illustrating a specific procedure of stop position control.

A description will be made on a specific procedure of the stop position control with reference to a flowchart in FIG. 8. Step S1 in the flowchart illustrated in FIG. 8 is executed after the engine stop control is performed.

In step S1, the controller 200 determines whether the engine speed has been reduced to be lower than a reference speed N2. The controller 200 makes this determination on the basis of the detection result of the crank angle sensor SN1. The reference speed N2 is set in advance and stored in the controller 200. If the determination in step S1 is NO and it is determined that the engine speed is equal to or higher than the reference speed N2, the controller 200 repeats step S1 and waits until the engine speed becomes lower than the reference speed N2. On the other hand, if the determination in step S1 is YES and it is determined that the engine speed has become lower than the reference speed N2, the controller 200 proceeds the processing to step S2.

In step S2, the controller 200 retards a phase of the intake valve 11 by the intake S-VT 13a so as to retard intake valve close timing IVC, which is close timing of the intake valve 11, to a first reference timing (the intake retardation control). The first reference timing is set in advance and stored in the controller 200. The first reference timing is set at timing on the retarded side from the intake valve close timing IVC immediately after execution of the engine stop control (immediately after execution of the control for fully closing the throttle valve 32) and on the advanced side from second reference timing, which will be described below.

Next, in step S3, the controller 200 predicts engine stop timing, which is timing at which the engine E is stopped, and the cylinder stop position, that is, the position of each of the pistons 5 at the time when the engine E is stopped. The controller 200 predicts the above timing and position on the basis of the detection value of the intake manifold pressure sensor SN3, the detection value of the crank angle sensor SN1, the detection value of the cam angle sensor SN2, and the like. After step S3, the processing proceeds to step S4.

In step S4, the controller 200 determines whether the engine is stopped after the piston 5 passes second compression top dead center on the basis of the prediction result in step S3. More specifically, in step S4, the controller 200 determines whether there are two cylinders that pass the compression top dead center (TDCc) in a period from a current time point to time at which the engine is stopped.

If the determination in step S4 is NO and it is determined that the engine E is not stopped at timing after the piston 5 passes the second compression top dead center from the current time point, the processing returns to step S3, and the controller 200 continues to predict the engine stop timing and the cylinder stop position.

Figure 9:
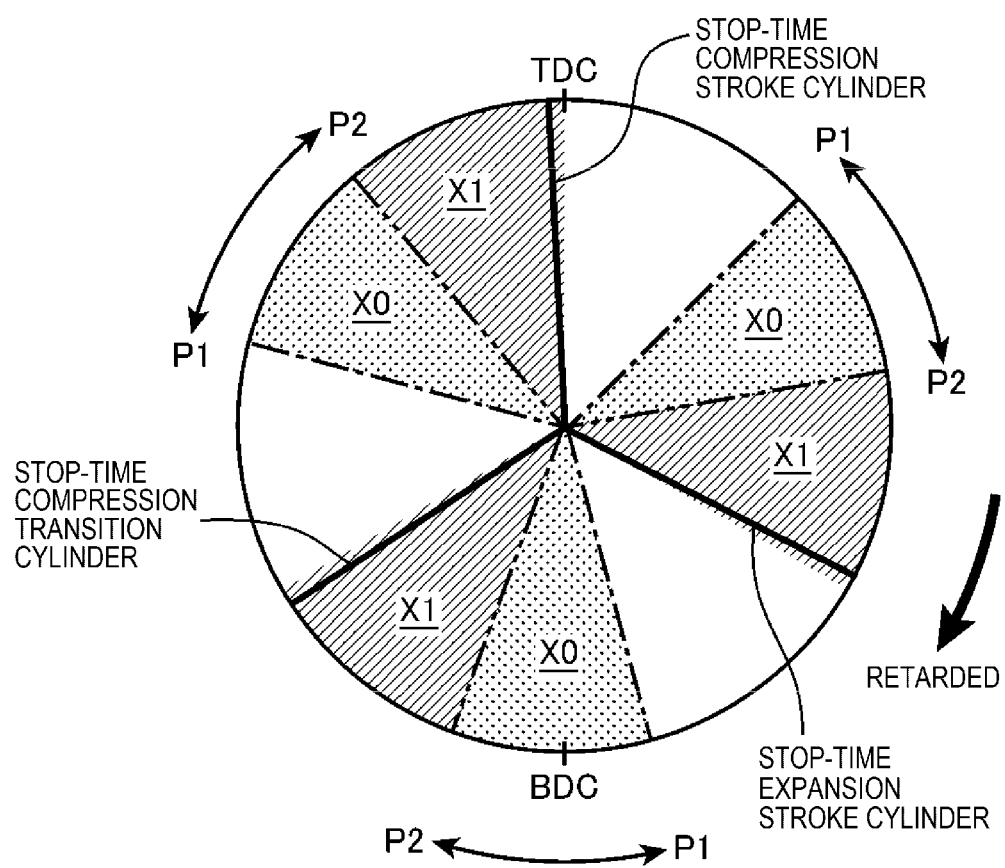
FIG. 9 is a graph illustrating an avoidance required range of the cylinder stop position.

On the other hand, if the determination in step S4 is YES and it is determined that the engine is stopped after the piston 5 passes the second compression top dead center, the controller 200 proceeds the processing to step S5. In step S5, the controller 200 determines whether the cylinder stop position that is predicted in step S3 (hereinafter referred to as a predicted cylinder stop position) is within an avoidance required range X1. As illustrated in FIG. 9, the avoidance required range X1 is a range on the retarded side of the target range X0, and is a range from a state where the piston 5 in the stop-time compression stroke cylinder is located at a position on the most retarded side in the target range X0 (40° CA before the compression top dead center (BTDCc) corresponding to the second position P2) to a state where the piston 5 in the stop-time compression stroke cylinder reaches the compression top dead center (TDCc). That is, in step S5, it is determined whether a predicted stop position of the stop-time compression stroke cylinder is a position that is closer to the top dead center (the compression top dead center TDCc) than the target range thereof.

If the determination in step S5 is YES and it is determined that the predicted cylinder stop position is within the avoidance required range X1 (if it is determined that the predicted stop position of the stop-time compression stroke cylinder is on the top dead center side from the target range X0), in step S6, the controller 200 increases the opening degree of the throttle valve 32. In this embodiment, the controller 200 increases the opening degree of the throttle valve 32 such that an increase amount of the opening degree of the throttle valve 32 is increased as a shifting amount of the predicted cylinder stop position from the target range X0 (the second position P2) is increased (the throttle opening degree increase control). After step S5, the processing proceeds to step S7. On the other hand, if the determination in step S5 is NO and it is determined that the predicted cylinder stop position is not within the avoidance required range X1, the controller 200 proceeds the processing to step S7.

In step S7, the controller 200 executes control for retarding the phase of the intake valve 11 by the intake S-VT 13a so as to retard the intake valve close timing IVC to the second reference timing (the intake retardation control). When the intake valve close timing IVC reaches the second reference timing, the controller 200 terminates the processing (the stop position control). The second reference timing is set in advance and stored in the controller 200. For example, the second reference timing is set at timing on the most retarded side at which the intake valve close timing IVC can be set. Here, in the flowchart illustrated in FIG. 8, step S7 is executed after step S5. However, step S5 and step S7 are executed almost simultaneously. Immediately after the determination in step S4 is YES and it is determined that the engine is stopped after the piston 5 passes the second compression top dead center, the controller 200 executes step S7.

The execution of the above intake retardation control reduces a possibility that the cylinder stop position is located on the advanced side from the target range X0.

More specifically, during the engine operation, the intake valve close timing IVC is set on the retarded side from the intake bottom dead center BDCi. Accordingly, in the case where the phase of the intake valve 11 is retarded immediately after it is determined that the engine E is stopped after the piston 5 passes the second compression top dead center, a retarded amount of the intake valve close timing IVC from the intake bottom dead center BDCi is increased, and a blow-back amount of the intake air from inside of the cylinder 2 (the combustion chamber 6) to the intake port 9 is increased. After the above determination is made, that is, immediately before the engine is stopped, the intake stroke of the stop-time compression stroke cylinder is performed after the intake stroke of the stop-time expansion stroke cylinder. Accordingly, in the case where the phase of the intake valve 11 is retarded as described above, the blow-back amount of the intake air from the inside of the cylinder 2 as the stop-time compression stroke cylinder to the intake port 9 is increased. In this way, it is possible to suppress the intake amount of the stop-time compression stroke cylinder from becoming excessively larger than the intake amount of the stop-time expansion stroke cylinder. Thus, such a possibility is reduced that lifting of the piston 5 in the stop-time compression stroke cylinder is suppressed due to the intake amount of the stop-time compression stroke cylinder becoming excessively larger than the intake amount of the stop-time expansion stroke cylinder, and such a possibility is also reduced that the stop-time compression stroke cylinder is located on the bottom dead center side from the target range X0, that is, the cylinder stop position is located on the advanced side of the target range X0.

In addition, the execution of the above throttle opening degree increase control reduces a possibility that the cylinder stop position is located on the retarded side of the target range X0.

More specifically, in the case where the opening degree of the throttle valve 32 is increased immediately after it is determined that the engine E is stopped immediately after the piston 5 passes the second compression top dead center, the intake amount of the stop-time compression stroke cylinder whose intake stroke is performed later than the stop-time expansion stroke cylinder is increased immediately before the engine stop. Accordingly, as described above, in the case where the opening degree of the throttle valve 32 is increased as described above when it is determined that the predicted cylinder stop position is within the avoidance required range X1 (when it is determined that the predicted stop position of the stop-time compression stroke cylinder is located on the top dead center side from the target range X0), lifting of the piston 5 in such a cylinder is suppressed by the increase in the intake amount of the stop-time compression stroke cylinder. As a result, such a possibility is reduced that the stop-time compression stroke cylinder is located on the top dead center side from the target range X0, that is, the cylinder stop position is within the avoidance required range X1 on the retarded side from the target range X0.

(Start Timing Adjustment Control)

As described above, when the stop position control including the intake retardation control and the throttle opening degree increase control is executed, the possibility that the cylinder stop position is out of the target range X0 is suppressed to be low. However, depending on a drive delay associated with deterioration of the intake S-VT 13a or the like and a fluctuation in sliding resistance of the piston 5 associated with deterioration of the engine 5 or the like, for example, the cylinder stop position may be out of the target range X0 even when the stop position control is executed.

Figure 10:
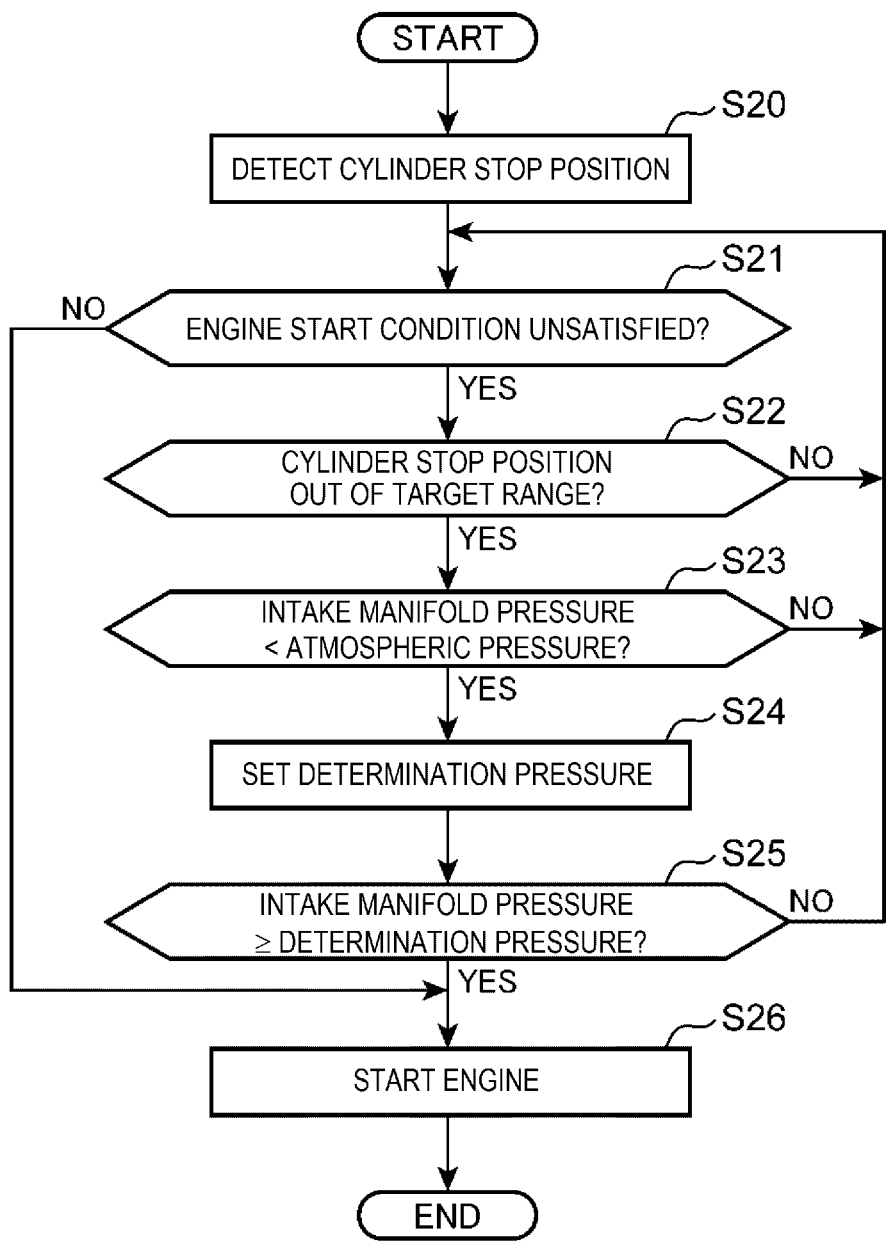
FIG. 10 is a flowchart illustrating a specific procedure of start timing adjustment control.

To handle such a problem, the controller 200 (the start control module 202) executes the start timing adjustment control, which will be described next, to suppress the starting torque to be low even when the cylinder stop position is out of the target range X0. FIG. 10 is a flowchart illustrating a procedure of the start timing adjustment control. Step S20 in FIG. 10 is initiated when the engine E is completely stopped.

In step S20, the controller 200 detects the cylinder stop position. The controller 200 calculates the current cylinder stop position on the basis of the detection results of the crank angle sensor SN1 and the cam angle sensor SN2. Just as described, in this embodiment, the cylinder stop position, that is, the position of the piston 5 in each of the cylinders 2 at the engine stop time is detected on the basis of the detection results of the crank angle sensor SN1 and the cam angle sensor SN2, and these sensors SN1, SN2 each are an example of a "stop position sensor" in the present disclosure.

In step S21, the controller 200 determines whether the engine start condition is not satisfied. The controller 200 makes this determination on the basis of the detection values of the vehicle speed sensor SN7, the accelerator operation amount sensor SN6, and the like.

If the determination in step S21 is NO and it is determined that the engine start condition is satisfied, the processing proceeds to step S25, and the controller 200 starts the engine E by using the motor M.

On the other hand, if the determination in step S21 is YES and it is determined that the engine start condition is not satisfied, the controller 200 proceeds the processing to step S22. In step S22, the controller 200 (the determination section 203) determines whether the cylinder stop position, which is calculated in step S20, is out of the target range X0.

If the determination in step S22 is NO and the cylinder stop position is located within the target range X0, the controller 200 maintains a stopped state of the engine E, and the processing returns to step S21.

On the other hand, if the determination in step S22 is YES and it is determined that the cylinder stop position is out of the target range X0, the processing proceeds to step S23. In step S23, the controller 200 determines whether the intake manifold pressure is lower than the atmospheric pressure, that is, whether the intake manifold pressure is a negative pressure. The controller 200 makes this determination on the basis of the detection results of the atmospheric pressure sensor SN8 and the intake manifold pressure sensor SN3. Here, even after the engine E is stopped, the controller 200 sequentially receives the detection results of the atmospheric pressure sensor SN8 and the intake manifold pressure sensor SN3, and makes the determination in step S23 on the basis of the atmospheric pressure and the intake manifold pressure that are detected when step S23 is executed.

If the determination in step S23 is NO and the intake manifold pressure is equal to or higher than the atmospheric pressure and thus is not the negative pressure, the controller 200 maintains the stopped state of the engine E, and the processing returns to step S21.

On the other hand, if the determination in step S23 is YES and the intake manifold pressure is lower than the atmospheric pressure, that is, the negative pressure, the controller 200 proceeds the processing to step S24. In step S24, the controller 200 sets a determination pressure to be used in next step S25.

The determination pressure is the intake manifold pressure that serves as a criterion for determining whether to start the engine E. While the starting torque varies by the cylinder stop position as described above, the starting torque also varies by the intake manifold pressure. More specifically, when the engine E is started, the motor M lifts each of the pistons 5 in the stop-time compression stroke cylinder and the stop-time compression transition cylinder while compressing the intake air in these cylinders 2 (the combustion chamber 6). For this reason, an amount of the torque of the motor M that is consumed to start the engine E, that is, an amount of the starting torque is reduced as the intake amount in the each of the cylinders 2, which are the stop-time compression stroke cylinder and the stop-time compression transition cylinder, is reduced. Here, the stop-time compression transition cylinder is the cylinder whose stop position is located within a range from 60° CA before the intake bottom dead center (BBDCi) to 60° CA after the intake bottom dead center (ABDCi), and the intake valve 11 is still open at the engine stop time. In other words, the intake valve 11 is controlled such that the intake valve 11 of the stop-time compression transition cylinder is in an opened state at the engine stop time. In this embodiment, due to the execution of the intake retardation control, the intake valve close timing IVC is retarded immediately before the engine stop, and the intake valve 11 of the stop-time compression transition cylinder is thereby in the opened state at the engine stop time. Just as described, since the engine E is stopped in the opened state of the intake valve 11, the intake amount of the stop-time compression transition cylinder is reduced as the intake manifold pressure is reduced. That is, since the intake valve 11 is opened, the pressure in the cylinder 2 as the stop-time compression transition cylinder is substantially equal to the intake manifold pressure, and the intake manifold pressure being low means that the pressure in the cylinder 2 as the stop-time compression transition cylinder is low and the intake amount thereof is small. Thus, even in the case where the cylinder stop position is the same, the starting torque is reduced as the intake manifold pressure is reduced.

Figure 11:
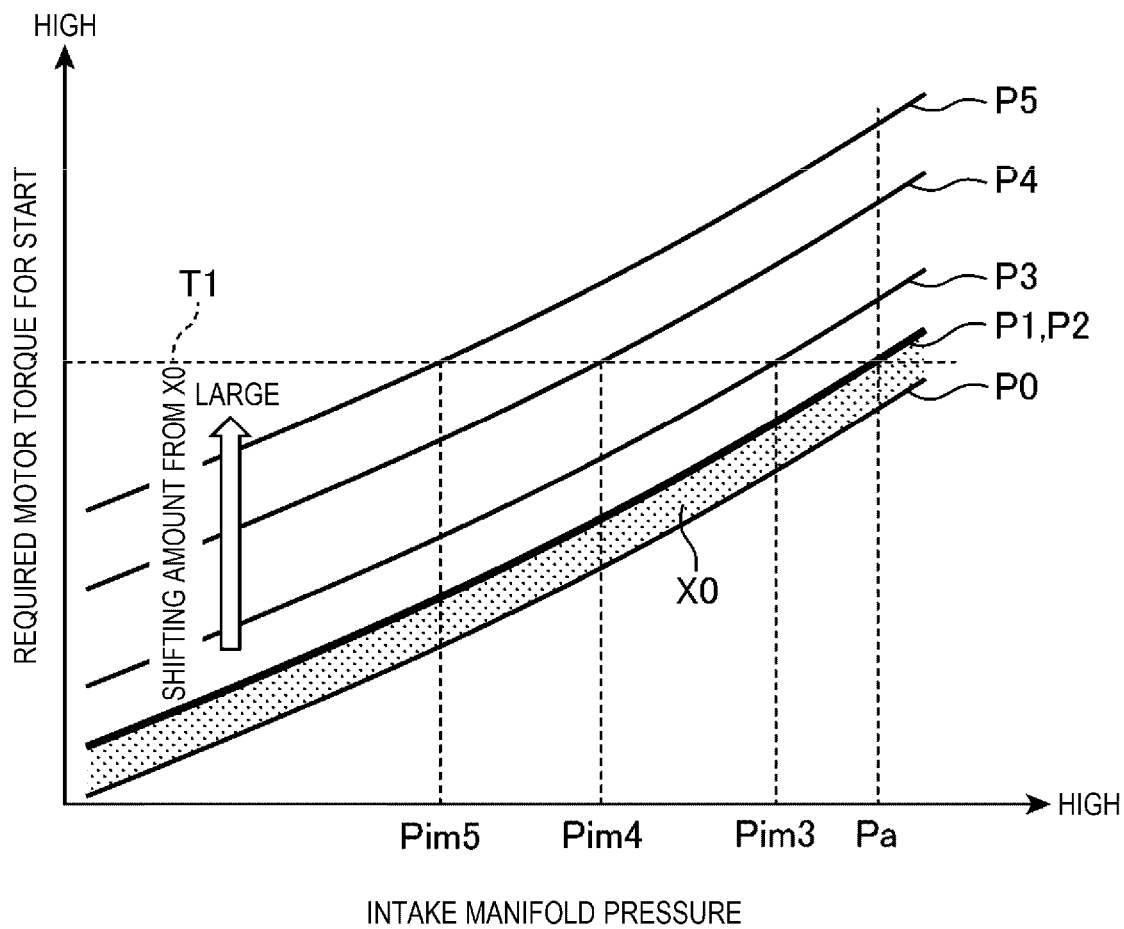
FIG. 11 is a graph illustrating a relationship between an intake manifold pressure and starting torque at each of the cylinder stop positions.

FIG. 11 is a graph illustrating a relationship between the intake manifold pressure and the starting torque at each of the cylinder stop positions. FIG. 11 illustrates the above relationship at each of the optimum position P0, the first and second positions P1, P2, a position corresponding to a third position P3 illustrated in FIG. 6 and shifted from the target range X0, a position corresponding to the fourth position P4 illustrated in FIG. 6 and having a larger shifting amount from the target range X0 than the third position P3, and a position corresponding to a fifth position P5 illustrated in FIG. 6 and having a larger shifting amount from the target range X0 than the fourth position P4. Here, Pa in FIG. 11 represents the atmospheric pressure.

As illustrated in FIG. 11, at any of the cylinder stop positions, the starting torque is increased as the intake manifold pressure is increased. In addition, at any of the intake manifold pressures, the starting torque is increased as the shifting amount of the cylinder stop position from the optimum position P0 is increased. Furthermore, in the case where the cylinder stop position is the position shifted from the target range X0, the starting torque is increased as the shifting amount of the cylinder stop position from the target range X0 is increased. Moreover, in the case where the cylinder stop position is the position shifted from the target range X0, the intake manifold pressure at which the starting torque becomes the reference torque T1 is reduced as the shifting amount of the cylinder stop position from the target range X0 is increased.

In this embodiment, the determination pressure is set at the intake manifold pressure at which the starting torque at the current cylinder stop position becomes the above reference torque T1. As described above, the intake manifold pressure at which the starting torque becomes the reference torque T1 is reduced as the shifting amount of the cylinder stop position from the target range X0 is increased. For this reason, in step S24, the controller 200 sets the determination pressure to a lower value as the shifting amount of the cylinder stop position, which is detected in step S20, from the target range X0 is increased.

In this embodiment, the intake manifold pressure at the time when the starting torque becomes the reference torque T1 is set in advance per cylinder stop position and is stored as a map.

For example, in FIG. 11, the determination pressure at the time when the current cylinder stop position is the third position P3 is set at a pressure indicated by Pim3, the determination pressure at the time when the current cylinder stop position is the fourth position P4 is set at a pressure indicated by Pim4, and the determination pressure at the time when the current cylinder stop position is the fifth position P5 is set at the pressure indicated by Pim5. Then, these settings are stored in the controller 200. The controller 200 extracts, from this map, the intake manifold pressure that corresponds to the cylinder stop position detected in step S20, and sets such an intake manifold pressure as the determination pressure.

After step S24, the processing proceeds to step S25. In step S25, the controller 200 determines whether the intake manifold pressure is equal to or higher than the determination pressure that is set in step S24. The determination in step S25 is made on the basis of the detection result of the intake manifold pressure sensor SN3 during execution of step S25.

If the determination in step S25 is NO and the intake manifold pressure is lower than the determination pressure, the controller 200 maintains the stopped state of the engine E, and the processing returns to step S20.

On the other hand, if the determination in step S25 is YES and the intake manifold pressure is equal to or higher than the determination pressure, the processing proceeds to step S26, and the controller 200 starts the engine E by using the motor M.

As described above, in this embodiment, in the case where the cylinder stop position is shifted from the target range X0 (the determination in step S22 is YES) due to the execution of the start timing adjustment control, where the intake manifold pressure is lower than the atmospheric pressure (the determination in step S23 is YES), and where the intake manifold pressure is equal to or higher than the determination pressure (the determination in step S25 is YES), the engine E is started even when the engine start condition is not satisfied (the determination in step S21 is YES).

(Operational Effects and the Like)

As it has been described so far, in the above embodiment, it is possible to prevent the torque of the motor M, which is consumed to start the engine E, from becoming excessively high while suppressing degraded fuel efficiency of the engine E by executing the start timing adjustment control after the engine stop.

More specifically, when the engine E is stopped, air and the like leak into the intake passage 30 from an area around the throttle valve 32 and the like. For this reason, even in the case where the intake manifold pressure immediately after the engine stop is lower than the atmospheric pressure, the intake manifold pressure is gradually increased as a stopped period of the engine E extends, and the intake manifold pressure eventually becomes the atmospheric pressure. In the case where the intake manifold pressure is equal to or higher than the atmospheric pressure, the starting torque becomes higher than that in the case where the intake manifold pressure is lower than the atmospheric pressure. For this reason, in the case where the above start timing adjustment control is not executed and the engine E is started simply upon the satisfaction of the engine start condition, the engine E has to be started in a state where the intake manifold pressure is the atmospheric pressure in an extended stopped period of the engine E. Then, in the case where the cylinder stop position is shifted from the target range X0 at this time, the starting torque, which is increased due to such shifting, is further increased due to the intake manifold pressure at the atmospheric pressure.

To handle such a problem, in the above embodiment, in the case where the cylinder stop position is shifted from the target range X0 and the intake manifold pressure is lower than the atmospheric pressure, the engine E is started without waiting for the satisfaction of the engine start condition. Thus, even in the case where the starting torque is increased due to a fact that the cylinder stop position is shifted from the target range X0, it is possible to prevent the starting torque from being further increased.

In the above embodiment, in the case where the cylinder stop position is shifted from the target range X0 and the intake manifold pressure is lower than the determination pressure, which is further lower than the atmospheric pressure, the engine E is started upon the satisfaction of the engine start condition even when the intake manifold pressure is lower than the atmospheric pressure. That is, in the case where the cylinder stop position is shifted from the target range X0 and the intake manifold pressure immediately after the engine stop is lower than the determination pressure, the engine E is started when the intake manifold pressure is increased to the determination pressure or when the engine start condition is satisfied. Thus, when the engine start condition is not satisfied, regardless of a fact that the intake manifold pressure is not increased to the determination pressure and the starting torque is suppressed to be lower than the reference torque T1, that is, allowable torque, it is possible to avoid the start of the engine E, secure the stopped period of the engine E, and suppress degradation of fuel economy thereof.

In particular, in the above embodiment, the determination pressure is changed according to the cylinder stop position. Thus, it is possible to secure the stopped period of the engine E while reliably suppressing the starting torque to torque near the allowable torque.

Modified Embodiments

In the above embodiment, the description has been made on the case where the stop position control is executed to locate the cylinder stop position within the target range X0 before the engine is stopped. However, this stop position control may not be executed.

In the above embodiment, the description has been made on the case where the determination pressure is changed according to the cylinder stop position. However, the determination pressure may be set at a constant pressure regardless of the cylinder stop position.

In the above embodiment, the description has been made on the case where, in the case where the cylinder stop position is shifted from the target range X0 and the intake manifold pressure is lower than the determination pressure, and even in the case where the intake manifold pressure is lower than the atmospheric pressure, the engine E is started at the time when the intake manifold pressure is increased to the determination pressure or at the time when the engine start condition is satisfied. However, the control for waiting the intake manifold pressure to be increased to the determination pressure may not be executed. That is, regardless of whether the intake manifold pressure is lower than the determination pressure, the engine E may be started when such conditions are satisfied that the cylinder stop position is shifted from the target range X0 and that the intake manifold pressure is lower than the atmospheric pressure.

In the above embodiment, the description has been made on the case where the engine E is the six-cylinder engine having the six cylinders 2. However, the number of the cylinders in the engine E is not limited thereto and may be four or the like.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS 1 engine body
2 cylinder
5 piston
7 crankshaft
15 injector
30 intake passage
32 the throttle valve
200 controller (control device)
201 stop control module
202 start control module
203 determination module
E engine
M motor
SN1 crank angle sensor (stop position sensor)
SN2 cam angle sensor (stop position sensor)
SN3 intake manifold pressure sensor (intake pressure sensor)
SN8 atmospheric pressure sensor

The invention claimed is:

1. A start controller provided for an engine including a plurality cylinders, a plurality of injectors that supply fuel to a respective one of the cylinders, a respective piston that is provided in each of the cylinders in a reciprocal manner, a crankshaft that rotates in an interlocking manner with reciprocating motion of the piston, a motor capable of forcibly starting an engine by causing the crankshaft to rotate, and an intake passage through which intake air to be introduced into each of the cylinders flows, the start controller comprising:

a stop position sensor that detects a stop position of the piston in each of the cylinders at an engine stop time;

an intake pressure sensor that detects an intake pressure which is a pressure in the intake passage; and a control device that controls the engine including the injectors and the motor, wherein the control device includes a processor configured to execute:

a stop control module that stops a fuel supply into the cylinders by the injectors to stop the engine when a specified engine stop condition is satisfied;

a start control module that starts the engine by the motor when a specified engine start condition is satisfied after a stop of the engine; and a determination module that determines whether the stop position of the piston in each of the cylinders detected by the stop position sensor is within a specified target range after the stop of the engine, in a case where the determination module determines that the stop position of the piston in each of the cylinders is out of the target range and the intake pressure detected by the intake pressure sensor is lower than an atmospheric pressure, the start control module starts the engine by the motor even when the engine start condition is not satisfied, in a case where the determination module determines that the stop position of the piston in each of the cylinders is out of the target range and the intake pressure detected by the intake pressure sensor is lower than a specified determination pressure that is lower than the atmospheric pressure, the start control module starts the engine by the motor when the engine start condition is satisfied or when the intake pressure is increased to the determination pressure, the determination pressure is preset for each of a plurality of stop positions of the cylinders, the determination pressure is determined based on the stop position of the piston in each of the cylinders and the preset specified determination pressure, and the determination pressure is changed according to the stop position of the piston in each of the cylinders.

2. The start controller according to claim 1, wherein in a case where the determination module determines that the stop position of the piston in each of the cylinders is out of the target range, the start control module sets the determination pressure to a lower value as a shifting amount of the stop position of the piston from the target range is increased.

3. The start controller according to claim 1, wherein the target range is a position at which a starting torque is equal to or lower than a specified reference torque at a time when the intake pressure is the atmospheric pressure, and is set as a range from a first position on an advanced side from an optimum position, which is the position at the time when the starting torque becomes a minimum amount, to a second position on the retarded side from the optimum position.

4. The start controller according to claim 1, wherein the target range is a position at which a starting torque is equal to or lower than a specified reference torque at a time when the intake pressure is the atmospheric pressure, and is set as a range from a first position on an advanced side from an optimum position, that is the position that the cylinder stop position at the time when this starting torque becomes a minimum amount, to a second position on the retarded side from the optimum position.

5. The start controller according to claim 3, wherein the target range is a position at which a starting torque is equal to or lower than a specified reference torque at a time when the intake pressure is the atmospheric pressure, and is set as a range from a first position on an advanced side from an optimum position, that is the position that the cylinder stop position at the time when this starting torque becomes a minimum amount, to a second position on the retarded side from the optimum position.

* * * * *